(12) United States Patent
Yahata et al.

(10) Patent No.: US 12,510,526 B2
(45) Date of Patent: Dec. 30, 2025

(54) INSPECTION APPARATUS AND INSPECTION METHOD

(71) Applicant: SHIMADZU CORPORATION, Kyoto (JP)

(72) Inventors: Masahito Yahata, Kyoto (JP); Kazuma Maeda, Kyoto (JP); Tatsuya Kataoka, Kyoto (JP); Yuichi Masuda, Kyoto (JP); Nobuhiro Namikawa, Kyoto (JP); Akioki Nakamori, Kyoto (JP); Tatsuya Iwama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 397 days.

(21) Appl. No.: 18/041,748

(22) PCT Filed: May 6, 2021

(86) PCT No.: PCT/JP2021/017325
§ 371 (c)(1),
(2) Date: May 11, 2023

(87) PCT Pub. No.: WO2022/038838
PCT Pub. Date: Feb. 24, 2022

(65) Prior Publication Data
US 2023/0349879 A1   Nov. 2, 2023

(30) Foreign Application Priority Data
Aug. 20, 2020   (JP) .................................. 2020-139349

(51) Int. Cl.
*G01N 33/18* (2006.01)
*G01N 1/14* (2006.01)
(Continued)

(52) U.S. Cl.
CPC ........... *G01N 33/1846* (2013.01); *G01N 1/14* (2013.01); *G01N 27/06* (2013.01);
(Continued)

(58) Field of Classification Search
CPC ...... G01N 33/1846; G01N 1/14; G01N 27/06; G01N 33/1893; G01N 31/005; C02F 1/32; C02F 1/72
See application file for complete search history.

(56) References Cited

U.S. PATENT DOCUMENTS

| | | | |
|---|---|---|---|
| 4,666,860 A | 5/1987 | Blades et al. | |
| 2003/0211626 A1 | 11/2003 | Davenport et al. | |

(Continued)

FOREIGN PATENT DOCUMENTS

| | | | |
|---|---|---|---|
| CN | 1449492 A | | 10/2003 |
| JP | 2009162536 A | * | 7/2009 |

(Continued)

OTHER PUBLICATIONS

Office Action issued May 17, 2024 in Chinese Application No. 202180051081.6.
(Continued)

*Primary Examiner* — Fatemeh Esfandiari Nia
(74) *Attorney, Agent, or Firm* — Sughrue Mion, PLLC

(57) ABSTRACT

An inspection apparatus includes a measurement unit, a flow-in tube for flow of sample water into the measurement unit, a connection portion that connects a sample tube and the measurement unit to each other, a liquid sending portion that sends sample water to the measurement unit, a pressurization pump that increases a pressure in the inside of the sample tube, and a controller. The controller controls operations of the liquid sending portion and the pressurization pump to suppress within a prescribed range, variation in
(Continued)

pressure applied to sample water until sample water reaches the measurement unit from the inside of the sample tube.

8 Claims, 6 Drawing Sheets

(51) Int. Cl.
*G01N 27/06* (2006.01)
*C02F 1/32* (2023.01)
*C02F 1/72* (2023.01)

(52) U.S. Cl.
CPC ............ *G01N 33/1893* (2013.01); *C02F 1/32* (2013.01); *C02F 1/72* (2013.01)

(56) References Cited

U.S. PATENT DOCUMENTS

2009/0074619 A1* 3/2009 Akechi .............. G01N 33/1846
422/69
2016/0084784 A1 3/2016 Rajagopalan et al.
2018/0031568 A1 2/2018 Yamaguchi et al.

FOREIGN PATENT DOCUMENTS

| JP | 2012-202895 A | 10/2012 |
| JP | 6556699 B2 | 8/2019 |
| WO | 2016/132526 A1 | 8/2016 |

OTHER PUBLICATIONS

Extended European Search Report dated Aug. 13, 2024 in Application No. 21857990.2.
International Search Report PCT/JP2021/017325 dated Jul. 27, 2021.
Written Opinion PCT/JP2021/017325 dated Jul. 27, 2021.
Chinese Office Action dated Nov. 20, 2024 in Application No. 202180051081.6.

* cited by examiner

INSPECTION APPARATUS AND INSPECTION METHOD

CROSS REFERENCE TO RELATED APPLICATIONS

This application is a National Stage of International Application No. PCT/JP2021/017325 filed May 6, 2021, claiming priority based on Japanese Patent Application No. 2020-139349 filed Aug. 20, 2020.

TECHNICAL FIELD

The present disclosure relates to an inspection apparatus that measures a conductive property of sample water and an inspection method of measuring a conductive property of sample water.

BACKGROUND ART

A conductive property of sample water may be measured as an indicator that indicates a property of sample water. The conductive property of sample water is an indicator that indicates a ratio of an electrolyte dissolved in sample water, and used, for example, for measuring an amount of total organic carbon (TOC) in sample water. Specifically, a decomposed product resulting from oxidation of an organic substance in sample water varies the conductive property of sample water, and hence the decomposed product can be detected by measurement of the conductive property of sample water and the amount of TOC can be measured by detection of the decomposed product.

Japanese Patent No. 6556699 (PTL 1) discloses a device for measuring the conductive property of a liquid, which comprises a measuring chamber for containing a sampling volume to be irradiated with UV rays and a UV-transparent window being located between the measuring chamber and a source of UV rays, hermetically closing a first side of the measuring chamber. According to the disclosure in PTL 1, two measuring electrodes are etched intended as being in contact with the liquid present in the measuring chamber.

CITATION LIST

Patent Literature

PTL 1: Japanese Patent No. 6556699

SUMMARY OF INVENTION

Technical Problem

In measurement of a conductive property of sample water, air bubbles may be produced on a measurement electrode. Production of air bubbles on the measurement electrode results in change in area of contact between the measurement electrode and sample water and the conductive property to be measured becomes unstable.

Therefore, a pressure is reduced with the use of a degasser or the like to degas sample water in advance to suppress production of air bubbles on the measurement electrode. Degassing of sample water with the use of the degasser or the like, however, may vary the conductive property itself of sample water.

One object of the present disclosure is to prevent production of air bubbles on an electrode to measure a conductive property of sample water in a stable manner.

Solution to Problem

An inspection apparatus in the present disclosure includes a sampling portion that receives a container where sample water is stored and takes the sample water, a treatment unit that treats taken sample water, a measurement unit that measures a conductive property of treated sample water, a flow-in tube for introduction of the sample water into the measurement unit, a liquid sending portion that generates drive force for sending the sample water in the sample tube to the measurement unit, a gas feed portion that sends gas into the sample tube to pressurize the inside of the sample tube, and a controller that controls operations of the liquid sending portion and the gas feed portion. The controller controls the operations of the liquid sending portion and the gas feed portion to send the sample water to the measurement unit through the flow-in tube while the inside of the sample tube is pressurized with the gas.

An inspection method in the present disclosure includes sending gas into a sample tube where sample water is stored to pressurize inside of the sample tube, taking the sample water from the sample tube, treating taken sample water, sending the sample water to a measurement unit that measures a conductive property of treated sample water while the inside of the sample tube is pressurized with the gas, and measuring the conductive property of the sample water sent to the measurement unit.

Advantageous Effects of Invention

According to the present disclosure, sample water is sent to the measurement unit while the inside of the sample tube is pressurized with the gas, so that solubility of gas in sample water can be increased. Consequently, production of gas in sample water during liquid sending can be prevented and a conductive property of sample water can be measured in a stable manner.

DESCRIPTION OF EMBODIMENTS

Figure 1:
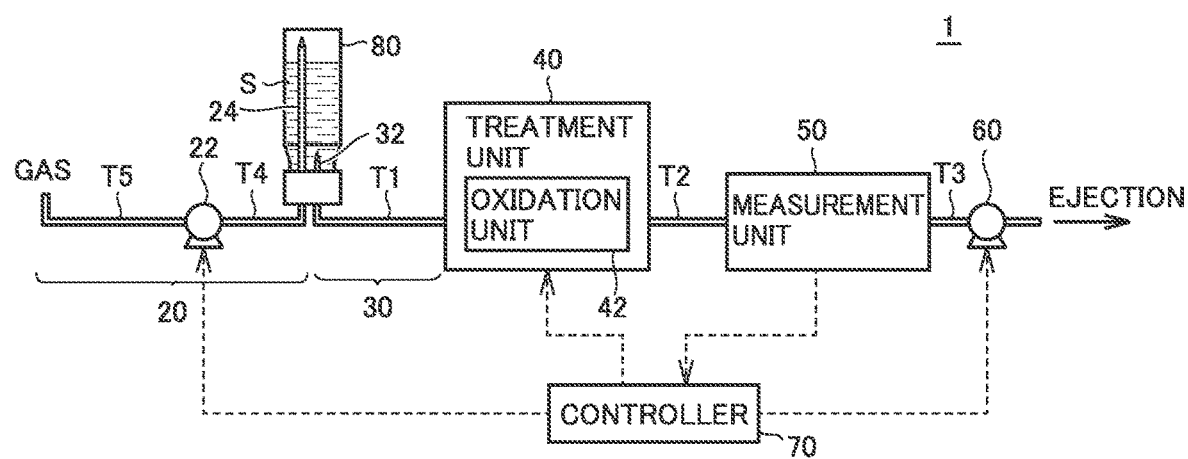
FIG. 1 is a schematic diagram for illustrating an overall configuration of an inspection apparatus 1.

An embodiment of the present disclosure will be described in detail below with reference to the drawings. The same or corresponding elements in the drawings have the same reference characters allotted and description thereof will not be repeated.

<Overall Configuration of Inspection Apparatus 1>

FIG. 1 is a schematic diagram for illustrating an overall configuration of an inspection apparatus 1. Inspection apparatus 1 is an apparatus that measures an amount of TOC (a concentration of TOC) in sample water. Inspection apparatus 1 is what is called a wet oxidation inspection apparatus that oxidizes an organic substance in sample water by emission of ultraviolet rays to sample water.

Referring to FIG. 1, inspection apparatus 1 includes a gas feed portion 20, a sampling portion 30, a treatment unit 40, a measurement unit 50, a liquid sending portion 60, and a controller 70.

Gas feed portion 20 sends gas into a sample tube 80 to pressurize the inside of sample tube 80. Gas feed portion 20 includes a pressurization pump 22 and a gas needle 24. Pressurization pump 22 generates drive force for sending gas into sample tube 80. Gas needle 24 is inserted in sample tube 80 to introduce gas sent by pressurization pump 22 into sample tube 80. Pressurization pump 22 and gas needle 24 are connected to each other through a tube T4. Pressurization pump 22 takes in gas through a tube T5 connected to pressurization pump 22. For example, an atmosphere may be adopted as the gas, however, gas different from the atmosphere may be applicable.

Sampling portion 30 is configured to take sample water S stored in sample tube 80. Sampling portion 30 includes a suction needle 32 inserted in sample tube 80. Suction needle 32 is a needle for suction of sample water S in sample tube 80 and connected to treatment unit 40 through a tube T1.

Treatment unit 40 treats taken sample water. Treatment unit 40 according to the present embodiment includes an oxidation unit 42 that oxidizes sample water S. Oxidation unit 42 is implemented by a UV light source, and it includes an inner tube in which sample water S passes through an interior space and an outer tube arranged around an outer circumference of the inner tube at a distance therefrom, although not shown. Discharge gas is sealed in a discharge space between the outer tube and the inner tube. Ultraviolet rays generated by excitation of discharge gas are emitted to the interior space in the inner tube. In other words, oxidation unit 42 is a double-wall excimer lamp. As a result of irradiation with ultraviolet rays, of sample water S that passes through the interior space in oxidation unit 42, an organic substance in sample water S is oxidized.

Treatment unit 40 should only treat taken sample water, and may perform, for example, treatment for adding a reagent to sample water. Though oxidation unit 42 is defined as oxidizing an organic substance in sample water S by irradiation of sample water with ultraviolet rays, it may chemically oxidize sample water S with the use, for example, of an oxidizing agent.

Suction needle 32 and an upstream side of the inner tube of oxidation unit 42 are connected to each other through tube T1. A tube T2 is connected to a downstream side of the inner tube of oxidation unit 42. The inner tube can also be said as a part of a flow channel through which sample water S passes.

Measurement unit 50 is a conductivity meter that measures a conductive property of sample water S treated by treatment unit 40, and includes a flow channel that can be connected to tube T2. A tube T3 is connected to a downstream side of a flow channel provided in measurement unit 50. In other words, sample water S that has passed through tube T2 flows into measurement unit 50 and sample water S that has passed through measurement unit 50 is ejected through tube T3. For example, measurement unit 50 includes a pair of electrodes arranged on the flow channel provided in measurement unit 50 as being in contact with sample water S, and measures a conductivity of sample water S with a two-terminal method. Measurement unit 50 should only be a component that measures an indicator indicating a conductive property of sample water, and it is not limited to a component that measures a conductivity. For example, measurement unit 50 may measure a resistivity. Though exemplary measurement unit 50 includes two electrodes, it may include four electrodes and measure the conductivity of sample water with another method such as a four-probe method or a four-terminal method.

Liquid sending portion 60 generates drive force for sending sample water S in sample tube 80 to measurement unit 50. For example, a pump is adopted as liquid sending portion 60, and liquid sending portion 60 is connected to tube T3 on the downstream side of measurement unit 50 by way of example. Liquid sending portion 60 may be arranged, for example, on the upstream side of measurement unit 50. With arrangement of gas feed portion 20 upstream from sample tube 80 and arrangement of liquid sending portion 60 downstream from measurement unit 50, a pressure applied to a flow channel from sample tube 80 to an exit of measurement unit 50 can be controlled by drive of gas feed portion 20 and liquid sending portion 60.

Controller 70 controls the entire inspection apparatus 1. Though not shown, controller 70 includes a central processing unit (CPU), a storage where a program and data are stored, and a communication interface (I/F) as main constituent elements. The constituent elements are connected to one another through a data bus.

The storage includes a read only memory (ROM), a random access memory (RAM), and a hard disk drive (HDD). A program to be executed by the CPU is stored in the ROM. Data generated by execution of a program by the CPU and data inputted through the communication I/F are temporarily stored in the RAM. The RAM can function as a temporary data memory that is used as a work area. The HDD is a non-volatile storage device. Instead of the HDD, a semiconductor storage device such as a flash memory may be adopted.

A program stored in the ROM may be stored in a storage medium and distributed as a program product. Alternatively, a program may be provided by an information provider, as a program product that can be downloaded through what is called the Internet.

A storage medium is not limited to a digital versatile disk read only memory (DVD-ROM), a compact disc read-only memory (CD-ROM), a flexible disk (FD), and a hard disk, and may be a medium that carries a program in a fixed manner such as a magnetic tape, a cassette tape, an optical disc (a magneto-optical (MO) disc/a mini disc (MD)/a digital versatile disc (DVD)), an optical card, and a semiconductor memory such as a mask ROM, an electronically programmable read-only memory (EPROM), an electronically erasable programmable read-only memory (EEPROM), and a flash ROM. A recording medium is a non-transitory medium from which a computer can read a program.

Controller 70 controls operations of gas feed portion 20 and liquid sending portion 60 such that sample water S is sent to measurement unit 50 while the inside of sample tube 80 is pressurized with gas. By thus sending sample water S to measurement unit 50 while the inside of sample tube 80 is pressurized with gas, solubility of gas in sample water S can be increased. Consequently, generation of gas in sample water during liquid sending can be prevented and the conductive property of sample water S can be measured in a stable manner.

Controller 70 controls treatment unit 40 to treat sample water S, and receives a detection value from measurement unit 50 to perform processing for measuring the conductive property of sample water S.

Controller 70 may maintain the pressure in sample tube 80 in a state higher than the atmospheric pressure. Since oxidation unit 42 oxidizes sample water S to generate a decomposed product in the present embodiment, a concentration of gas in the flow channel until measurement unit 50 increases. By setting the pressure in sample tube 80 to the state higher than the atmospheric pressure to increase the solubility of gas in sample water S, generation of gas in sample water during liquid sending can be prevented in spite of increase in concentration of gas in the flow channel.

<Method of Attaching Sample Tube 80 to Inspection Apparatus 1>

Figure 2:
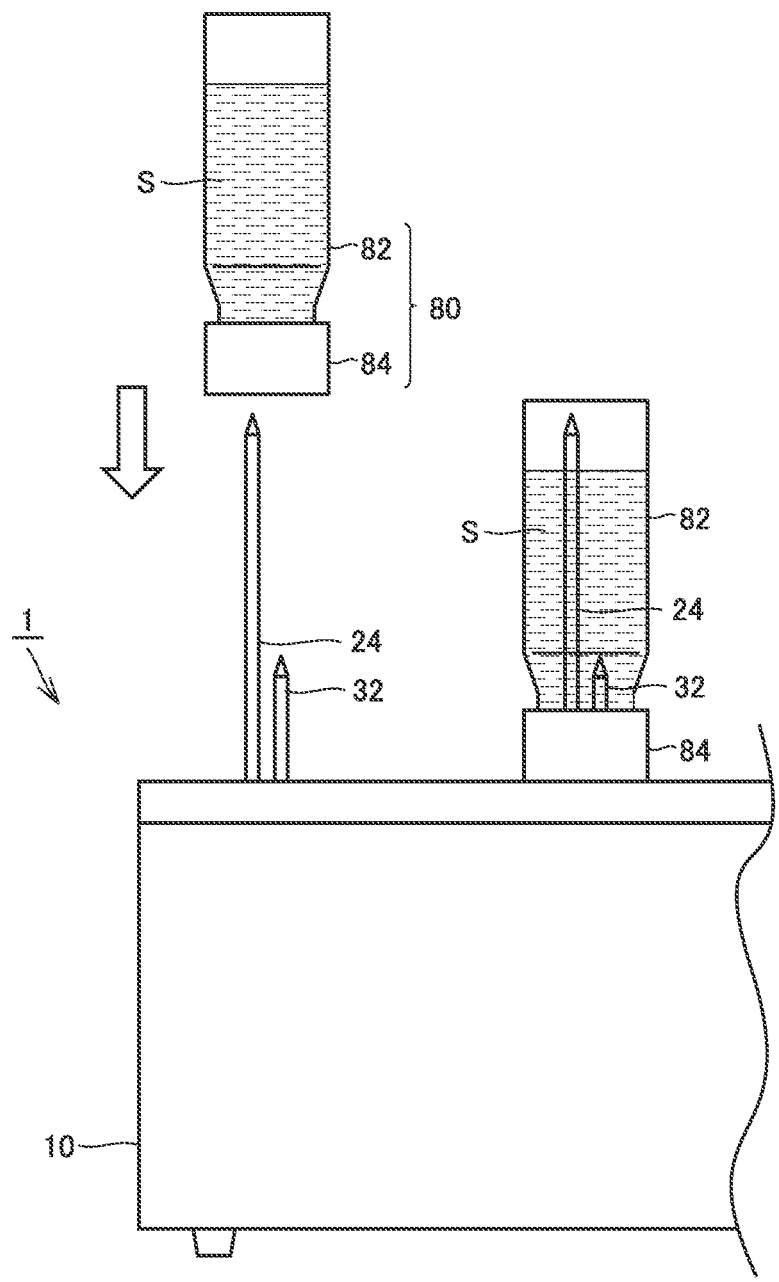
FIG. 2 is a diagram for illustrating a method of attaching a sample tube 80 to inspection apparatus 1.

FIG. 2 is a diagram for illustrating a method of attaching sample tube 80 to inspection apparatus 1. A direction of gravity is defined as a downward direction and a direction opposite thereto is defined as an upward direction below. Referring to FIG. 2, gas needle 24 is fixed to a housing 10 of inspection apparatus 1 such that a gas injection port of gas needle 24 faces up. Similarly, suction needle 32 is fixed to housing 10 of inspection apparatus 1 such that a suction port of suction needle 32 faces up. In housing 10, pressurization pump 22, treatment unit 40, measurement unit 50, liquid sending portion 60, controller 70, and tubes T1 to T5 through which these components are connected to one another are arranged, although they are not shown.

Sample tube 80 is constituted of a main body 82 and a cap 84. Cap 84 is made of rubber. Therefore, gas needle 24 and suction needle 32 can penetrate cap 84.

For example, a user can attach sample tube 80 to inspection apparatus 1 by pressing sample tube 80 against housing 10 downward from above while cap 84 of sample tube 80 faces down, such that suction needle 32 and gas needle 24 penetrate cap 84.

Thus, by fixing suction needle 32 and gas needle 24 to housing 10 in the present embodiment, the user can attach sample tube 80 to inspection apparatus 1 by pressing sample tube 80 against housing 10 downward from above. Since only an operation to move sample tube 80 in the direction of gravity is sufficient to attach sample tube 80, sample tube 80 can easily be attached.

Gas needle 24 is longer than suction needle 32, and has such a length that, while sample tube 80 is attached to inspection apparatus 1, the gas injection port of gas needle 24 is located above a liquid level of sample water S. Suction needle 32 is shorter than gas needle 24, and has such a length that, while sample tube 80 is attached to inspection apparatus 1, the suction port of suction needle 32 through which sample water S is suctioned is located in sample water S.

By setting such a length of gas needle 24 that the gas injection port of gas needle 24 is located above the liquid level of sample water S while sample tube 80 is attached to inspection apparatus 1, production of air bubbles in sample tube 80 can be prevented. Prevention of production of air bubbles in sample tube 80 can prevent the air bubbles from being sent through suction needle 32 to measurement unit 50. In addition, prevention of production of air bubbles in sample tube 80 can reduce an area of contact between gas and sample water S and can suppress occurrence of contamination.

<Inspection Processing>

Figure 3:
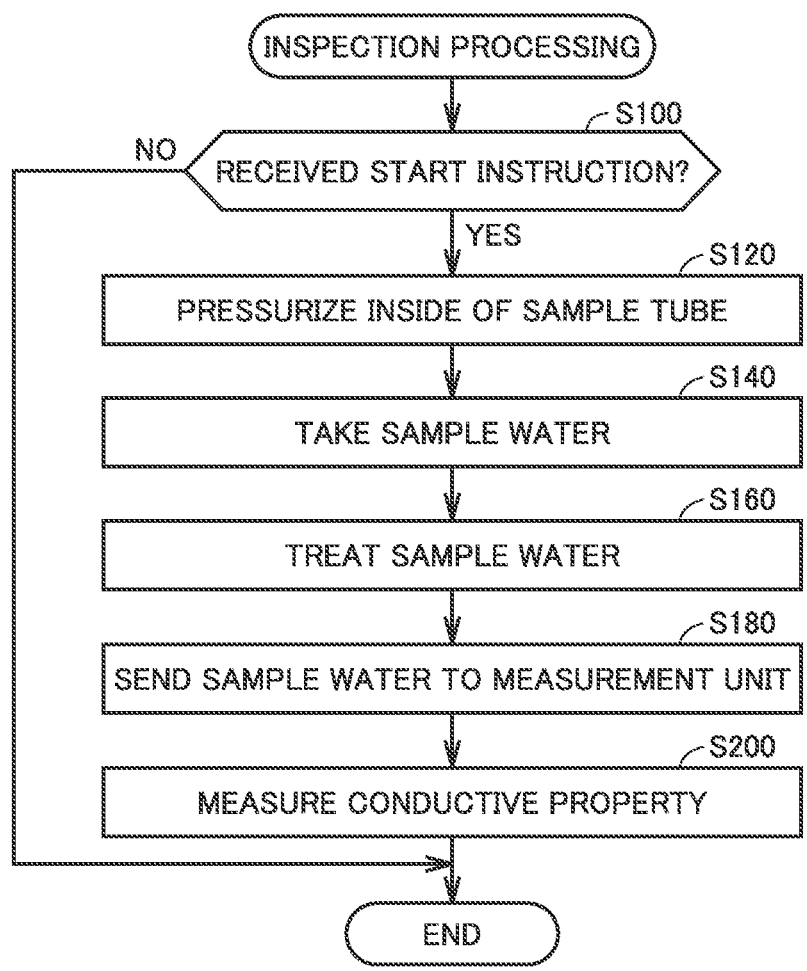
FIG. 3 is a flowchart showing exemplary inspection processing performed by a controller 70.

FIG. 3 is a flowchart showing exemplary inspection processing performed by controller 70. The inspection processing is performed, for example, by execution of a program by the CPU of controller 70.

In S100, controller 70 determines whether or not it has received an instruction to start inspection. When controller 70 has not received the instruction (NO in S100), it quits the inspection processing. The start instruction is received, for example, by attachment by the user of sample tube 80 to housing 10 and an operation onto a not-shown start switch or the like. When controller 70 determines that it has received the start instruction (YES in S100), it performs processing in S120.

In S120, controller 70 has gas sent to sample tube 80 to pressurize the inside of sample tube 80. More specifically, controller 70 instructs gas feed portion 20 to send gas into sample tube 80 and has pressurization pump 22 driven. At this time, a flow rate of gas sent into sample tube 80 by gas feed portion 20 is higher than a flow rate of sample water S sent from sample tube 80 to treatment unit 40. In S120, controller 70 may not have liquid sending portion 60 driven such that sample water S is not sent from sample tube 80 to treatment unit 40.

In S140, controller 70 has sample water S taken. More specifically, controller 70 has liquid sending portion 60 driven such that sample water S is suctioned into suction needle 32 through the suction port of suction needle 32. At this time, the flow rate of sample water S suctioned into suction needle 32 is preferably controlled to the flow rate approximately the same as the flow rate of gas sent into sample tube 80 by gas feed portion 20. Under such control, the pressure applied in S120 can be maintained.

In S160, controller 70 has taken sample water S treated. More specifically, controller 70 instructs treatment unit 40 to perform treatment for oxidizing sample water S. In the present embodiment, controller 70 instructs oxidation unit 42 of treatment unit 40 to start irradiation with ultraviolet rays. Treatment in S160 is started at timing when taken sample water S passes through tube T1 and reaches oxidation unit 42. While treatment in S160 is being performed, controller 70 preferably stops drive of gas feed portion 20 (pressurization pump 22) and drive of liquid sending portion 60 such that sample water S remains in oxidation unit 42.

In S180, controller 70 has sample water S sent to measurement unit 50 while the inside of sample tube 80 is pressurized with gas. For example, controller 70 can control gas feed portion 20 and liquid sending portion 60 such that the flow rate of gas sent into sample tube 80 and the flow rate of sample water S sent to measurement unit 50 are equal to each other, and can thus have sample water S sent to measurement unit 50 while the pressure applied in S120 is maintained. As sample water S flows through the flow channel, pressure loss occurs. Therefore, the pressure applied to sample water S that has reached measurement unit 50 becomes lower than the pressure applied to sample water S in sample tube 80. Controller 70 may control gas feed portion 20 and liquid sending portion 60 such that the flow rate of gas sent into sample tube 80 is higher than the flow rate of sample water S sent to measurement unit 50. Under such control, the pressure loss caused by the flow of sample water S through the flow channel can be compensated for by pressurization with gas, to thereby suppress variation in pressure in the flow channel.

In S200, controller 70 measures the conductive property of sample water S. More specifically, controller 70 receives a detection value from measurement unit 50.

Processing in S180 and processing in S200 may simultaneously be performed.

First Modification

In the embodiment, sample tube 80 is attached to inspection apparatus 1 by fixing suction needle 32 and gas needle 24 to housing 10 and pressing sample tube 80 against housing 10 downward from above. The construction of a connection portion is not limited to the construction according to the embodiment.

Figure 4:
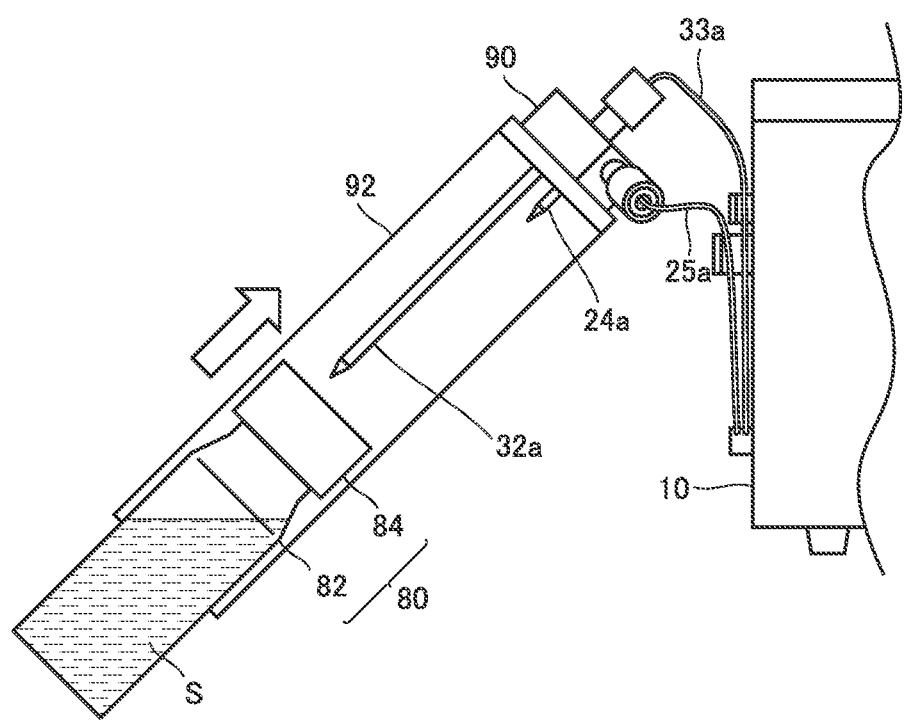
FIG. 4 is a diagram for illustrating a method of attaching a sample tube 80 to an inspection apparatus according to a first modification.
Figure 5:
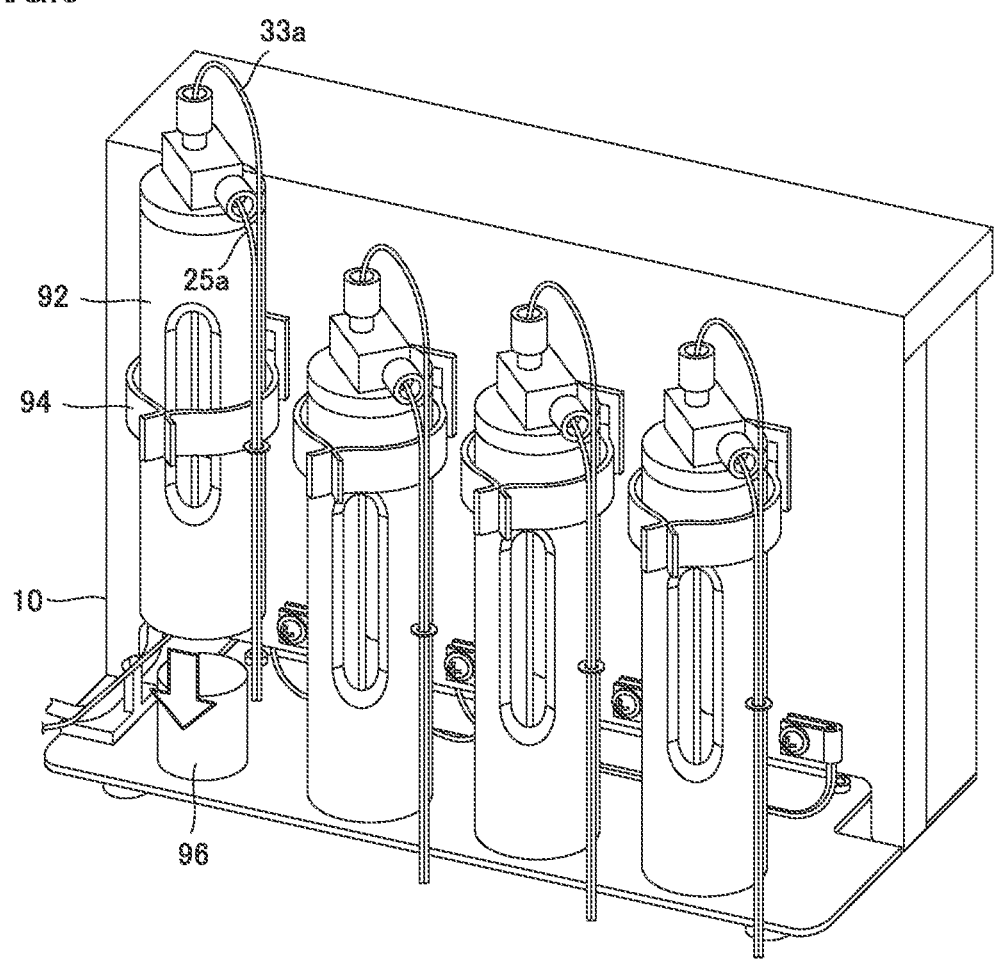
FIG. 5 is a diagram for illustrating a state after attachment of sample tube 80 to the inspection apparatus according to the first modification.

An inspection apparatus according to a first modification will be described with reference to FIGS. 4 and 5. FIG. 4 is a diagram for illustrating a method of attaching sample tube 80 to the inspection apparatus according to the first modification. FIG. 5 is a diagram for illustrating a state after attachment of sample tube 80 to the inspection apparatus according to the first modification.

Referring to FIG. 4, the inspection apparatus according to the first modification is different from inspection apparatus 1 according to the embodiment in including a gas needle 24a and a suction needle 32a instead of gas needle 24 and suction needle 32. Gas needle 24a and suction needle 32a are different from gas needle 24 and suction needle 32 in that gas needle 24a is shorter than suction needle 32a.

The inspection apparatus according to the first modification further includes a fixing portion 90 for fixing gas needle 24a and suction needle 32a, a gas soft tube 25a connected to gas needle 24a, and a suction soft tube 33a connected to suction needle 32a.

Suction soft tube 33a is connected to tube T1 connected to treatment unit 40 arranged in housing 10, although not shown. In other words, suction needle 32a is connected to tube T1 through which sample water S is introduced into treatment unit 40 via suction soft tube 33a.

Similarly, gas soft tube 25a is connected to tube T4 connected to pressurization pump 22 arranged in housing 10, although not shown. In other words, gas needle 24a is connected to tube T4 through which gas from pressurization pump 22 passes via gas soft tube 25a.

The inspection apparatus according to the first modification further includes a cylinder 92 formed around suction needle 32a and gas needle 24a. Cylinder 92 has one end provided with fixing portion 90 and has the other end opened. As shown in FIG. 4, in connection of sample tube 80 to the inspection apparatus by insertion of gas needle 24a and suction needle 32a in sample tube 80, with cap 84 facing up, cylinder 92 is moved downward from above, sample tube 80 is moved upward from below, or both of cylinder 92 and sample tube 80 are moved, so that suction needle 32a and gas needle 24a penetrate cap 84 and sample tube 80 is attached to the inspection apparatus.

Referring to FIG. 5, the inspection apparatus according to the modification further includes a holder 94 and a base 96 attached to housing 10. Holder 94 fixes cylinder 92. Base 96 functions as a location where sample tube 80 is set while cylinder 92 is attached to holder 94.

Gas needle 24a is shorter than suction needle 32a, and has such a length that, while sample tube 80 is attached to the inspection apparatus, a gas injection port of gas needle 24a is located above the liquid level of sample water S. Suction needle 32a is longer than gas needle 24a, and has such a length that, while sample tube 80 is attached to the inspection apparatus, a suction port of suction needle 32a through which sample water S is suctioned is located in sample water S.

In the inspection apparatus according to the first modification, sample tube 80 is attached to each needle from below the needle. Since the injection port of gas needle 24a is located above the liquid level of sample water S while the sample tube is attached, sample water S does not come into contact with the injection port of gas needle 24a during attachment works. Therefore, contamination from the side of gas needle 24a can be prevented at the time of replacement with sample tube 80 where different sample water S is stored.

Suction needle 32a and gas needle 24a are connected to tubes T1 and T4 with suction soft tube 33a and gas soft tube 25a being interposed, respectively. Suction needle 32a and gas needle 24a are fixed to fixing portion 90. Therefore, suction needle 32a and gas needle 24a can be moved together and the needles can readily penetrate sample tube 80.

Second Modification

Inspection apparatus 1 according to the embodiment may further include a filter that removes a substance in the atmosphere. Inspection apparatus 1 according to the embodiment may further include a pressure gauge that measures a pressure applied to the flow channel from pressurization pump 22 until liquid sending portion 60.

Figure 6:
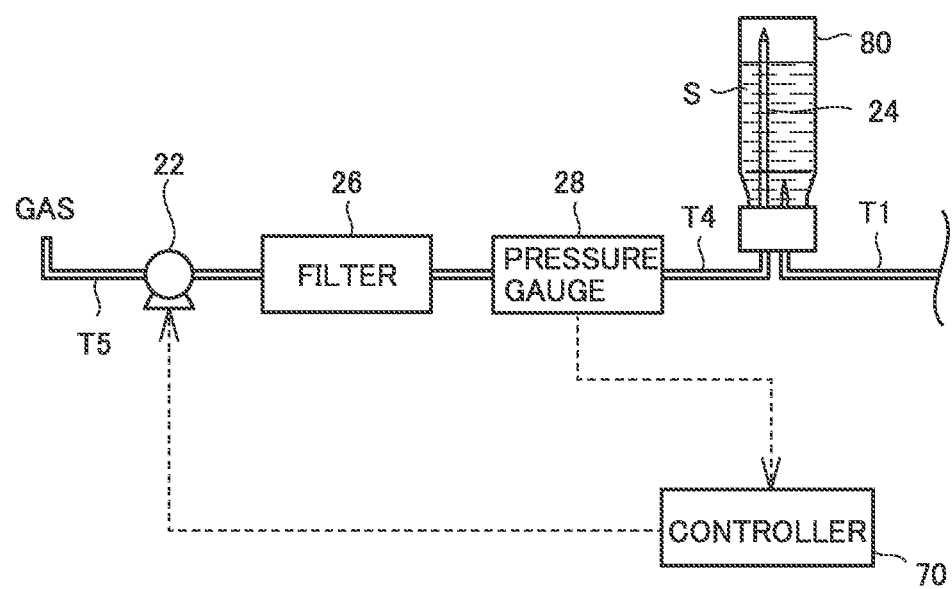
FIG. 6 is a schematic diagram for illustrating a configuration of an inspection apparatus according to a second modification.

FIG. 6 is a schematic diagram for illustrating a configuration of an inspection apparatus according to a second modification. FIG. 6 does not show features in common to those in inspection apparatus 1 according to the embodiment. Referring to FIG. 6, the inspection apparatus according to the second modification further includes a filter 26 and a pressure gauge 28.

Filter 26 removes a substance that affects measurement of a conductivity from gas sent into sample tube 80. For example, filter 26 removes carbon dioxide in the atmosphere. Filter 26 may remove organic carbon that has volatilized, instead of or in addition to carbon dioxide. Filter 26 should only be able to remove at least some of carbon dioxide and organic carbon, even though it is not able to completely remove carbon dioxide and organic carbon. Contamination from the atmosphere can thus be prevented and the conductivity can more accurately be measured. Filter 26 should only be arranged upstream from sample tube 80 and may be arranged, for example, upstream from pressurization pump 22.

Pressure gauge 28 measures a pressure applied to at least a part of the flow channel from pressurization pump 22 (gas feed portion) until measurement unit 50. In an example shown in FIG. 6, pressure gauge 28 is arranged between filter 26 and sample tube 80, and measures a pressure applied to the flow channel between pressurization pump 22 and sample tube 80. Pressure gauge 28 may be arranged anywhere on the flow channel from pressurization pump 22 (gas feed portion) until measurement unit 50.

For example, controller 70 may control pressurization pump 22 and liquid sending portion 60 in accordance with a result of measurement by pressure gauge 28. With arrangement of pressure gauge 28, a user can test leakage in the flow channel from pressurization pump 22 until measurement unit 50. For example, after the pressure applied to the flow channel by pressurization pump 22 is set to a prescribed value, pressure gauge 28 measures variation over time in pressure, with pressurization pump 22 and liquid sending portion 60 being turned off. Leakage in the flow channel can be tested based on variation over time in pressure.

Aspects

The embodiment described above is understood by a person skilled in the art as specific examples of aspects below.

(Clause 1) An inspection apparatus according to one aspect includes a sampling portion that receives a sample tube where sample water is stored and takes the sample water, a treatment unit that treats taken sample water, a measurement unit that measures a conductive property of treated sample water, a flow-in tube for introduction of the sample water into the measurement unit, a liquid sending portion that generates drive force for sending the sample water in the sample tube to the measurement unit, a gas feed portion that sends gas into the sample tube to pressurize inside of the sample tube, and a controller that controls operations of the liquid sending portion and the gas feed portion. The controller controls the operations of the liquid sending portion and the gas feed portion to send the sample water to the measurement unit through the flow-in tube while the inside of the sample tube is pressurized with the gas.

According to the inspection apparatus described in Clause 1, sample water is sent to the measurement unit while the inside of the sample tube is pressurized with gas, so that solubility of gas in sample water can be increased. Consequently, generation of gas in sample water during liquid sending can be prevented and the conductive property of sample water can be measured in a stable manner.

(Clause 2) In the inspection apparatus described in Clause 1, the treatment unit includes an oxidation unit that oxidizes the sample water. The controller controls the operations of the liquid sending portion and the gas feed portion to maintain a pressure in the sample tube at a pressure higher than an atmospheric pressure.

According to the inspection apparatus described in Clause 2, the oxidation unit oxidizes sample water and a decomposed product is generated. Therefore, though a concentration of gas in the flow channel until the measurement unit increases, by increase in solubility of gas in sample water as a result of increase in pressure, generation of gas in sample water during liquid sending can be prevented.

(Clause 3) The inspection apparatus described in Clause 1 or 2 further includes a pressure gauge that measures a pressure applied to at least a part of a flow channel from the gas feed portion until the measurement unit.

According to the inspection apparatus described in Clause 3, with the pressure gauge being provided, leakage in the flow channel can be tested or a result of measurement by the pressure gauge is configured to be sent to the controller, so that the gas feed portion and the measurement unit can be controlled in accordance with a result of measurement by the pressure gauge.

(Clause 4) In the inspection apparatus described in any one of Clauses 1 to 3, the gas feed portion includes a filter that removes from the gas, a substance that varies the conductive property of the sample water.

According to the inspection apparatus described in Clause 4, contamination from gas can be prevented and a conductivity can more accurately be measured.

(Clause 5) In the inspection apparatus described in any one of Clauses 1 to 4, the sampling portion includes a suction needle inserted in the sample tube, the suction needle taking the sample water in the sample tube. The gas feed portion includes a gas needle inserted in the sample tube, the gas needle introducing the gas into the sample tube. The gas needle is shorter in length than the suction needle.

According to the inspection apparatus described in Clause 5, by insertion of the needles into the sample tube in the direction of gravity, the sample tube and a connection portion can be connected to each other without contact of the gas needle with sample water. Contamination from the side of the gas needle can be prevented at the time of replacement with a sample tube where different sample water is stored.

(Clause 6) The inspection apparatus described in Clause 5 further includes a fixing portion that fixes the suction needle and the gas needle. The sampling portion further includes a suction soft tube connected to the suction needle. The gas feed portion further includes a gas soft tube connected to the gas needle.

According to the inspection apparatus described in Clause 6, the suction needle and the gas needle can be moved together, and the needles can readily be inserted in the sample tube.

(Clause 7) An inspection method according to one aspect includes sending gas into a sample tube where sample water is stored, to pressurize inside of the sample tube, taking the sample water from the sample tube, treating taken sample water, sending the sample water to a measurement unit that measures a conductive property of treated sample water while the inside of the sample tube is pressurized with the gas, and measuring the conductive property of the sample water sent to the measurement unit.

According to the inspection method described in Clause 7, sample water is sent to the measurement unit while the inside of the sample tube is pressurized with gas, so that solubility of gas in sample water can be increased. Consequently, generation of gas in sample water during liquid sending can be prevented and the conductive property of sample water can be measured in a stable manner.

The embodiment disclosed herein is also intended to be carried out as being combined as appropriate within the technically consistent scope. It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 1 inspection apparatus; 10 housing; 20 gas feed portion; 22 pressurization pump; 24, 24a gas needle; 25a gas soft tube; 26 filter; 28 pressure gauge; 30 sampling portion; 32, 32a suction needle; 33a suction soft tube; 40 treatment unit; 42 oxidation unit; 50 measurement unit; 60 liquid sending portion; 70 controller; 80 sample tube; 82 main body; 84 cap; 90 fixing portion; 92 cylinder; 94 holder; 96 base; S sample water

The invention claimed is:

1. An inspection apparatus comprising:
a sampling portion that receives a sample tube where sample water is stored and takes the sample water;
a treatment unit that treats taken sample water;
a measurement unit that measures a conductive property of treated sample water;
a flow-in tube for introduction of the sample water into the measurement unit;

a liquid sending portion that generates drive force for sending the sample water in the sample tube to the measurement unit;

a gas feed portion that sends gas into the sample tube to pressurize inside of the sample tube; and a controller that controls operations of the liquid sending portion and the gas feed portion, wherein the controller controls the operations of the liquid sending portion and the gas feed portion to send the sample water to the measurement unit through the flow-in tube while the inside of the sample tube is pressurized with the gas; and the gas feed portion includes a gas needle inserted in the sample tube, the gas needle introducing the gas into the sample tube; the controller maintains a pressure in the sample tube in a state higher than an atmospheric pressure, and a length of the gas needle is such that a gas injection port of the gas needle is located above the liquid level of the sample water.

2. The inspection apparatus according to claim 1, wherein the treatment unit includes an oxidation unit that oxidizes the sample water, and the controller controls the operations of the liquid sending portion and the gas feed portion to maintain a pressure in the sample tube at a pressure higher than an atmospheric pressure.

3. The inspection apparatus according to claim 1, further comprising a pressure gauge that measures a pressure applied to at least a part of a flow channel from the gas feed portion until the measurement unit.

4. The inspection apparatus according to claim 1, wherein the gas feed portion includes a filter that removes from the gas, a substance that varies the conductive property of the sample water.

5. The inspection apparatus according to claim 1, wherein the sampling portion includes a suction needle inserted in the sample tube, the suction needle taking the sample water in the sample tube, and the gas needle is shorter in length than the suction needle.

6. The inspection apparatus according to claim 5, further comprising a fixing portion that fixes the suction needle and the gas needle, wherein the sampling portion further includes a suction soft tube connected to the suction needle, and the gas feed portion further includes a gas soft tube connected to the gas needle.

7. An inspection method comprising:

sending gas into a sample tube where sample water is stored, to pressurize inside of the sample tube via a gas feed portion;

taking the sample water from the sample tube;

treating taken sample water;

sending the sample water to a measurement unit that measures a conductive property of treated sample water while the inside of the sample tube is pressurized with the gas; and measuring the conductive property of the sample water sent to the measurement unit;

the gas feed portion includes a gas needle inserted in the sample tube, the gas needle introducing the gas into the sample tube; a pressure in the sample tube is maintained in a state higher than an atmospheric pressure, and a length of the gas needle is such that a gas injection port of the gas needle is located above the liquid level of the sample water.

8. The inspection apparatus according to claim 1, wherein the sampling portion includes a suction needle inserted in the sample tube, the suction needle taking the sample water in the sample tube, and the gas needle is longer in length than the suction needle.

* * * * *